(12) United States Patent
Miller et al.

(10) Patent No.: US 6,259,750 B1
(45) Date of Patent: Jul. 10, 2001

(54) DIGITAL PHASE REVERSAL DETECTOR

(75) Inventors: John Miller; Alexander Tulai, both of Ottawa (CA)

(73) Assignee: Mitel Corporation, Kanata (CA)

( * ) Notice: Subject to any disclaimer, the term of this patent is extended or adjusted under 35 U.S.C. 154(b) by 0 days.

(21) Appl. No.: 09/051,355

(22) PCT Filed: Oct. 16, 1996

(86) PCT No.: PCT/CA96/00689

§ 371 Date: Jun. 25, 1998

§ 102(e) Date: Jun. 25, 1998

(87) PCT Pub. No.: WO97/15989

PCT Pub. Date: May 1, 1997

(30) Foreign Application Priority Data

Oct. 20, 1995 (CA) .................................................. 2161042

(51) Int. Cl.[7] .................................................. H04L 27/06
(52) U.S. Cl. .......................... 375/344; 379/410; 370/286; 370/289
(58) Field of Search .................................. 375/344, 226, 375/217, 279, 283; 379/386, 406, 410; 370/286, 289

(56) References Cited

U.S. PATENT DOCUMENTS 5,528,632 * 6/1996 Lin ........................................ 375/324
5,815,568 * 9/1998 Trump ................................... 379/386

* cited by examiner

*Primary Examiner*—Stephen Chin
*Assistant Examiner*—Mohammad Ghayour
(74) *Attorney, Agent, or Firm*—Marks & Clerk

(57) ABSTRACT

A phase reversal detector comprises a circuit for receiving an input signal subject to occasional phase reversals, a circuit for generating signals representing the quadrature components thereof, and a circuit responsive to a migration in the quadrature plane of the position of the quadrature components by an amount greater than a predetermined threshold to generate a signal indicative of a valid phase reversal. The detector is capable of exceeding the requirements of ITU standard G.165, and yet is simple to implement and works over a large dynamic range.

17 Claims, 2 Drawing Sheets

DIGITAL PHASE REVERSAL DETECTOR

FIELD OF THE INVENTION

This invention relates to the field of telecommunications, and more particularly to a method of detecting a valid phase reversal.

BACKGROUND OF THE INVENTION

There are certain situations in telecommunications where a phase reversal is used to signal a particular condition. For example, in ITU (International Telecommunications Union) standard G.165 entitled "General Characteristics of International Telephone Connections and International Telephone Circuits", a 2100 Hz tone signal that has a phase reversal every 450±25 ms is used to disable an echo canceller. A valid phase reversal is defined as a phase variation in the range of 180°±25° of a 2100 Hz (±21 Hz) tone. An invalid phase reversal is defined as a phase variation in the range of 0°±110°.

Some means must be provided for detecting valid phase reversals and rejecting invalid phase reversals. The detector employed must operate perfectly on signals having a level of −31 dBmø to 06 dBmø in conditions of white noise less than or equal to 11 dB below the level of the 2100 Hz tone signal. For white noise levels between 11 dB and 5 dB below the level of the tone signal, the percentage of correct operation should fall by no more than 1% for each dB.

The tone disabler is required to operate (disable the echo canceller) within one second of the receipt of the disabling signal.

While the G.165 standard specifies additional requirements, reliable phase reversal detection is essential for the proper functioning of the echo canceller tone disabling detector.

SUMMARY OF THE INVENTION

An object of the present invention is to provide a reliable phase reversal detector.

According to the present invention there is provided a phase reversal detector comprising means for receiving an input signal subject to occasional phase reversals, means for generating signals representing the quadrature components thereof, and means responsive to a migration in the quadrature plane of the position of said quadrature components by an amount greater than a predetermined threshold to generate a proportional signal indicative of a valid phase reversal.

The detector preferably includes means for adjusting the frequency of a local signal used in deriving the above-mentioned quadrature components.

The detector may also include means for bandpassing the incoming signal, which may be hard limited to eliminate the need for an automatic gain control circuit while ensuring the functionality of the detector over a large dynamic range of the input signal. The hard limiting operation is equivalent to applying the sign function to the band passed signal.

The invention also provides a method of detecting valid phase reversals in an input signal subject to occasional phase reversals, comprising the steps of generating signals representing the quadrature components thereof, determining the distance between said signals at different times in the quadrature plane, and generating a signal indicative of a valid phase reversal when said distance, or a value dependent thereon, exceeds a predetermined threshold value.

BRIEF DESCRIPTION OF THE DRAWINGS

The invention will now be described in more detail, by way of example only, with reference to the accompanying drawings, in which.

DETAILED DESCRIPTION OF PREFERRED EMBODIMENTS

Figure 1:
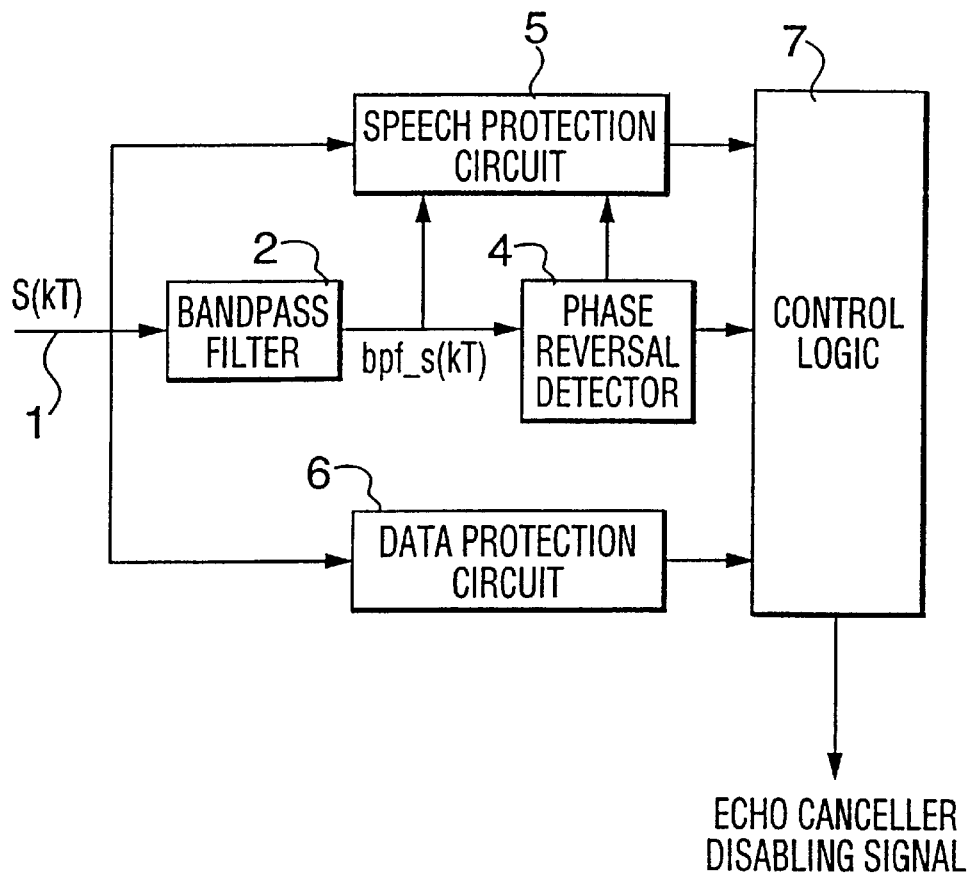
FIG. 1 is a general block diagram of an echo canceller tone disabler detector circuit employing a phase reversal detector in accordance with the invention.

Referring now to FIG. 1, an input signal 1 S(KT), which is an input sample expressed a 16 bit linear value (1 sign bit and 15 magnitude bits) is applied to a bandpass filter 2 having the following characteristics: Type: Chebyshev II; Order: 6 (three $2^{nd}$ order sections); sampling rate: 8000 Hz; Center Frequency: 2100 Hz; Passband bandwidth: 96 Hz; Passband ripple: 0.5 dB (maximum); Stop band ripple: 35 dB (minimum). The bandpass filter 2 extracts the 2100 Hz tone from the incoming signal S(KT).

The bandpass filter 2 outputs a signal bpf_S(KT), which is sampled at time t=KT, where T is the sampling period (125 µs for the 8000 Hz telephony rate). Signal bpf_S(KT) is applied to the input of phase reversal detector 4, which will be described in more detail below, and also to circuit 5 for protection against false operation due to speech. Circuit 5 also receives the input signal 1 S(KT).

The input signal 1 S(KT) is also applied to the input of a circuit 6 for protection against false operation due to a data signal, and the outputs of circuits 4, 5 and 6 are connected to a control logic unit 7, which produces an echo canceller disabling signal when a valid phase reversal is detected.

The operation per se of circuits 5, 6 and 7 is conventional and is well understood by a person skilled in the art.

Figure 2:
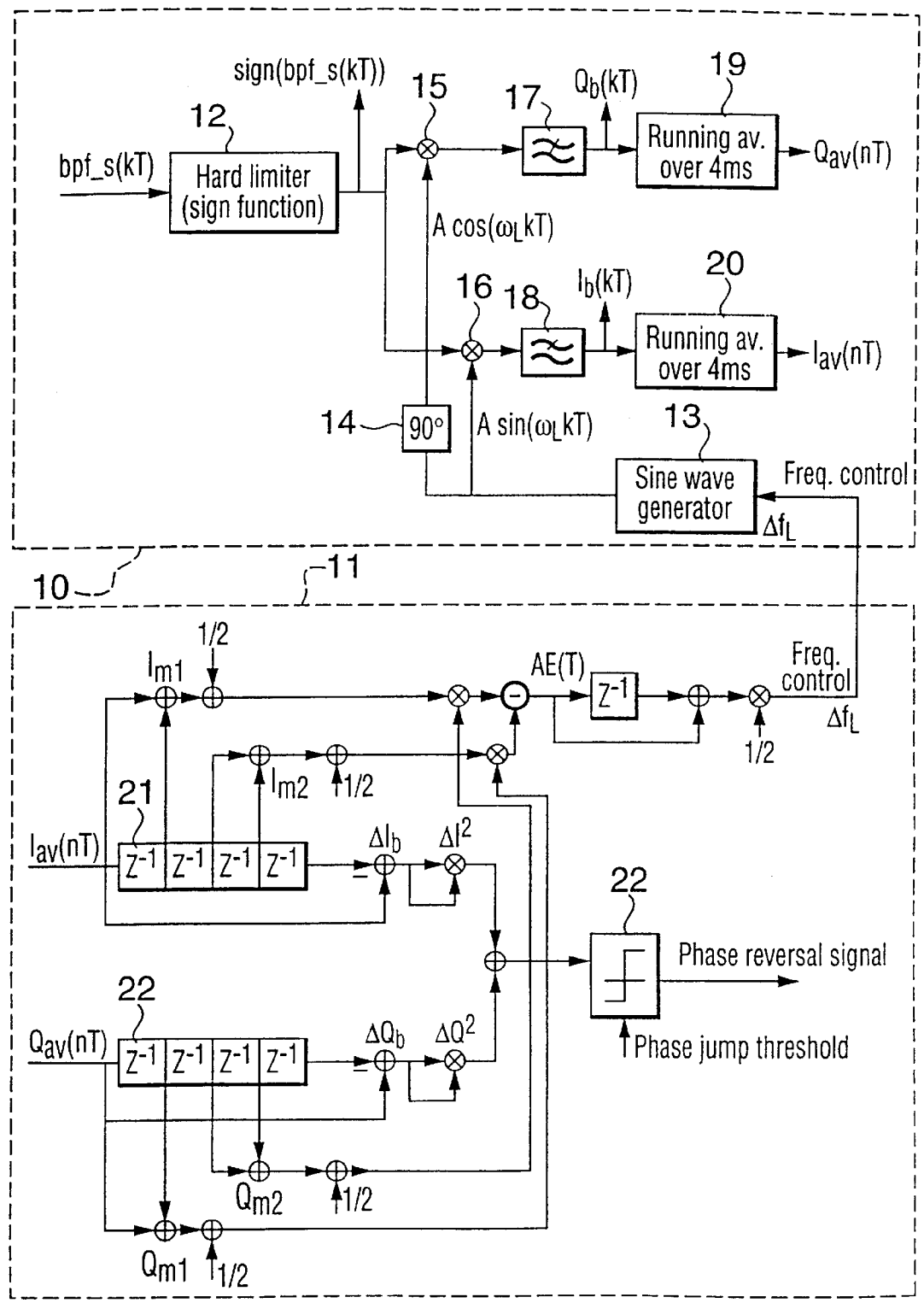
FIG. 2 is a detailed block diagram of a phase reversal detector in accordance with the invention.

The phase reversal detector circuit is shown in more detail in FIG. 2. This comprises a quadrature component calculating circuit 10 and a local frequency control circuit 11.

The band limited input signal bpf_S(KT) is applied to the (sign function) hard limiter 12 which derives signal sign (bpf_S(KT)). The band limiting function is equivalent to applying the sign function to the bandpass signal.

$$\text{sign}(x) = \begin{cases} -1 \text{ when } x \text{ is } < 0 \\ 0 \text{ when } x \text{ is } = 0 \\ 1 \text{ when } x \text{ is } > 0 \end{cases} \quad (1)$$

The quadrature components are calculated by multiplying the input signal with a locally calculated sine/cosine signal of 2100 Hz (initially). The components of the terms are A sin($\omega_L$KT) and A cos($\omega_L$KT), where A is a scaling constant, and $\omega_L = 2\pi f_L$ where $f_L$ is the local sine wave frequency initialized to 2100 Hz.

The signal A sin $\omega_L$(KT) is generated in sine wave generator 13 and passed through a 90° phase shifter 14 to multiplier 15, and directly to multiplier 16.

The outputs of multipliers 15 and 16 are respectively passed through low pass filters 17 and 18 to derive the quadrature components $Q_b$(KT), and $I_b$(KT). The inputs to the filters 17 and 18 are thus respectively sign (bpf_S(KT)× Asin ($w_L$KT) and sign (bpf_S(KT)×A cos ($w_L$KT) respectively.

The low pass filters 17 and 18 have the following characteristics in one embodiment: Type: elliptic, low pass; Order: 2; Sampling frequency: 8000 Hz; Passband bandwidth: 100 Hz; Passband ripple: 0.1 dB; and Stopband attenuation :40 dB.

The output of low pass filters 17, 18 is then presented to averaging circuits 19 and 20, which derive the average quadrature components over 4 ms (i.e. 32 samples at 8000 Hz).

The invention is based on the idea that a migration of the coordinates in the quadrature plane occurs at each phase reversal. While it would be possible to determine the Euclidean distance between the position of the quadrature point ($I_b(KT)$, $Q_b(KT)$) before and after phase reversal in the quadrature plane, due to filtering effects in the telephone network, the analog-to-digital converter, etc., the migration of the quadrature point when a phase jump occurs does not generally happen instantaneously. It can take at least 5 ms before the position of the quadrature point stabilizes in a new region after a phase jump (assuming that $f_I-f_L$ is very small or 0, otherwise the new position starts to shift around a circle in the quadrature plane).

Although this problem could be overcome by calculating the Euclidean distance between the current quadrature point and a previous one with a given delay, for example, a delay of 6 ms (48 samples at 8000 Hz), a difficulty arises from the fact that the incoming signal is not always clean. It is generally affected by severe noise, quantization effects, etc.

In the preferred embodiment, these effects are coped with by the averaging circuits 19 and 20 since the detection of the phase reversal is based on the average position in the quadrature plane over a predetermined period, in this case 4 ms. These average values are presented to the inputs of delay circuits 21, 22 in the local frequency control circuit 11.

The local sine and cosine signals are generated in the sine wave generator 13. This is controlled by the local frequency control circuit 11. These signals are calculated using the following recursive equations:

$$\sin(nw_LT)=2\times\sin((n-1)w_LT)\times\cos(w_LT)-\sin((n-2)w_LT) \quad (2)$$

$$\cos(nw_LT)=2\times\cos((n-1)w_LT)\times\cos(w_LT)-\cos((n-2)w_LT) \quad (3)$$

As an initial condition, the sine and cosine values at n=1 and n=2 can be used, and the sine/cosine at n=3 (and so on) calculated using equations (2) and (3) above.

If at start-up the frequency of the generated sine wave is exactly 2100 Hz, later on during the process of detecting a phase reversal, the frequency of the generated signal is varied to best match that of the incoming tone, which can vary in the range of 2079 Hz to 2121 Hz, that is 2100±21 Hz.

If the frequency of the locally generated sine/cosine wave signal, which is used for calculating the quadrature components, is different from the frequency of the incoming signal, the point $I_b(KT)$, $Q_b(KT)$ rotates on a circle in the quadrature plane I, Q with a frequency equal to the difference between the two frequencies as discussed above.

To avoid this, because of its effect on the probability of detecting a valid phase reversal or rejecting an invalid phase jump, the frequency of the locally generated sine wave must be controlled.

Equations (2) and (3) above can be rewritten in a different form as follows:

$$A\times\sin(nw_LT)=A\times\sin((n-1)w_LT)\times FAF-A\times\sin((n-2)w_LT) \quad (4)$$

$$A\times\cos(nw_LT)=A\times\cos((n-1)w_LT)\times FAF-A\times\cos((n-2)w_LT) \quad (5)$$

The FAF—(Frequency Adjusting Factor) is initialized to: $2\times\cos(w_LT)$ and A is the scaling factor.

A frequency control signal $\Delta f_L$ is used to modify the FAF (Frequency Adjusting Factor) and through it the frequency of the generated sine/cosine waves. $\Delta f_L$ is proportional to the signal difference $f_I-f_L$, where $f_I$ is the frequency of the incoming tone signal. An increase in the value of FAF results in a decrease in the frequency of the generated signal, while a decrease in the value of FAF has the opposite effect. Experiments have shown that in one embodiment subtracting $\Delta f_L/32$ from FAF once very 4 ms brings the $f_L$ close enough to make the phase reversal detection meet the requirement of the G.165 standard without a significant increase in complexity.

In the local frequency control circuit, the signals $I_{av}(nT)$ and $Q_{av}(nT)$ are queued over 4 samples to ensure reliable functioning of the circuit when a phase reversal results in a transition period of up to 12 ms. In this embodiment the queue is shifted every 4 ms.

To determine when phase reversal occurs, the Euclidean distance between the newest point $I_{av}(nT)$, $Q_{av}(nT)$ and the oldest in the queue is determined, and when the distance exceeds a predetermined threshold a valid phase reversal is assumed to have occurred. In order to reduce the computational power required, as shown in FIG. 2, in practice the square of the Euclidean distance is compared with the predetermined threshold in threshold detector 22.

As will be apparent from FIG. 2, the local frequency control circuit 11 calculates the signal $\Delta f_L$, which is input to the sine wave generator 13 in accordance with the following equations:

$$I_{m1}(t) = \frac{I_{av}(t) + I_{av}(t) - Z^{-1}}{2}, I_{m2}(t) = \frac{I_{av}(t) - Z^{-2} + I_{av}(t)Z^{-3}}{2} \quad (6)$$

$$Q_{m1}(t) = \frac{Q_{av}(t) + Q_{av}(t) - Z^{-1}}{2}, \quad (7)$$

$$I_{m2}(t) = \frac{Q_{av}(t) - Z^{-2} + Q_{av}(t)Z^{-3}}{2}$$

$$AE(t) = I_{m1} \times Q_{m2} - I_{m2} \times Q_{m1}, AE\text{- angle error} \quad (8)$$

$$\Delta f_L(t) = \frac{AE(t) + AE(t)Z^{-1}}{2} \quad (9)$$

The described phase reversal detector is simple to implement, works over a much larger dynamic range than required by the G.165 standard, does not require an AGC circuit and withstands high level of noise extremely well.

What is claimed is:

1. A phase reversal detector comprising means for receiving an input signal subject to occasional phase reversals, comprising a bandpass filter for band-limiting the input signals, means for generating signals representing the quadrature components of said band limited input signal, and means responsive to a migration in the quadrature plane of the position of said quadrature components by an amount greater than a predetermined threshold to generate a signal indicative of a valid phase reversal, characterized in that means for generating signals representing the quadrature components of said input signal comprises means for generating local sine and cosine signals whose frequency is varied to best match the frequency of incoming signal, and multiplier means for multiplying said locally generated sine and cosine signals with said input signal to generate said signals representing the quadrature components of the input signal.

2. A phase reversal detector as claimed in claim 1, characterized in that the outputs of said multiplier means are applied to the inputs of low pass filters.

3. A phase reversal detector as claimed in claim 2, characterized in that the outputs of said low pass filter are applied to respective averaging circuits, which derive the average values Qav (nT) and Iav(nT) over a predetermined time.

4. A phase reversal detector as claimed in claim 1, characterized in that said means for generating said sine and cosine signals includes an adjustable frequency oscillator, and means are provided for maintaining the frequency of said oscillator at the frequency of said input signal.

5. A phase reversal detector as claimed in claim 4, characterized in that said maintaining means comprise a circuit that derives an error signal $\Delta f_L$ from said signals representing the quadrature components of said input signal.

6. A phase reversal detector as claimed in claim 1, characterized in that said means responsive to migration in the quadrature plane comprises means for calculating the Euclidean distance between successive points in said quadrature plane, and a threshold detector for indicating a valid phase reversal when a distance value dependent on said distance exceeds a predetermined value.

7. A phase reversal detector as claimed in claim 6, characterized in that it further comprises means for generating signals representing the square of said Euclidean distance, said distance value representing the square of said Euclidean distance.

8. A phase reversal detector as claimed in claim 7, characterized in that said signals representing the quadrature components of the input signal are averaged over a predetermined period of time.

9. A phase reversal detector as claimed in claim 8, characterized in that said averaged signals are applied to a delay circuit, and the difference between said averaged signals at the output of said delay circuit and at the input thereof is determined in order to generate a signal representing said Euclidean distance.

10. A phase reversal detector as claimed in claim 8, characterized in that said band pass filter is a Chebyshev filter.

11. A phase reversal detector as claimed in claim 1, characterized in that it further comprises a hard limiter for hard limiting the input signals.

12. A method of detecting valid phase reversals in an input signal subject to occasional phase reversals, comprising the steps of band-limiting the input signals with a bandpass filter, generating signals representing the quadrature components thereof, determining the distance between said signals at different times in the quadrature plane, and generating a signal indicative of a valid phase reversal when said distance, or a value dependent thereon, exceeds a predetermined threshold value, characterized in that the signals representing the quadrature components of said input signal are generated by multiplying said input signal with locally generated sine and cosine signals whose frequency is varied to best match the frequency of incoming signal.

13. A method as claimed in claim 12, characterized in that said signals representing said quadrature components represent the average of said quadrature components over time.

14. A method as claimed in claim 13, characterized in that said locally generated sine and cosine signals are generated from an adjustable frequency oscillator whose frequency is controlled by an error signal derived from said quadrature signals.

15. A method as claimed in claim 13, characterized in that said signal indicating a valid phase reversal is generated when the square of said distance exceeds a predetermined threshold.

16. A method as claimed in claim 12, characterized in that said input signal is band limited by passing it through a band pass filter.

17. A method as claimed in claim 16, characterized in that said band limited input signal is passed though a hard limiter.

* * * * *